June 10, 1941.    M. MORGAN    2,245,442
SHEAR
Filed Dec. 6, 1939    2 Sheets-Sheet 1

INVENTOR
MYLES MORGAN
BY Albert G. Blodgett
ATTORNEY

June 10, 1941.  M. MORGAN  2,245,442
SHEAR
Filed Dec. 6, 1939   2 Sheets-Sheet 2
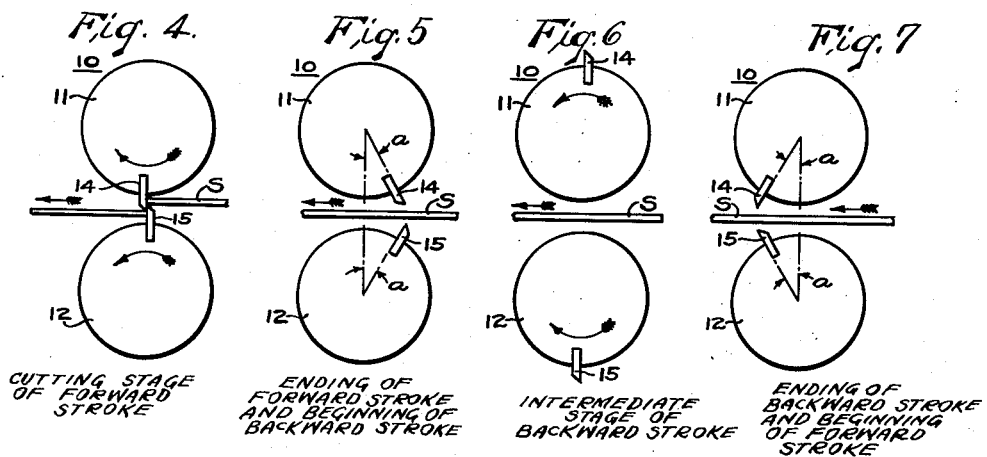
Fig. 4. CUTTING STAGE OF FORWARD STROKE
Fig. 5. ENDING OF FORWARD STROKE AND BEGINNING OF BACKWARD STROKE
Fig. 6. INTERMEDIATE STAGE OF BACKWARD STROKE
Fig. 7. ENDING OF BACKWARD STROKE AND BEGINNING OF FORWARD STROKE
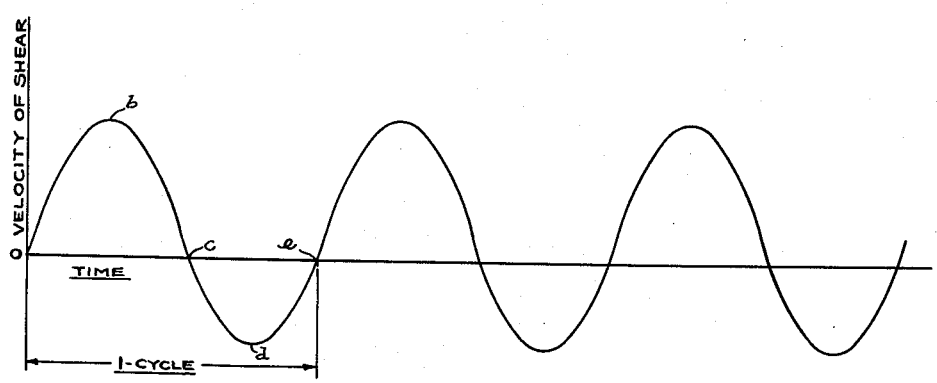
Fig. 8
INVENTOR
MYLES MORGAN
BY Albert G. Blodgett
ATTORNEY Patented June 10, 1941

2,245,442

UNITED STATES PATENT OFFICE 2,245,442

SHEAR

Myles Morgan, Worcester, Mass., assignor to Morgan Construction Company, Worcester, Mass., a corporation of Massachusetts Application December 6, 1939, Serial No. 307,765

13 Claims. (Cl. 164—68)

This invention relates to shears, and more particularly to so-called rotary flying shears for the transverse cutting of longitudinally moving material, such as the elongated hot metal product of a rolling mill.

One simple form of a rotary flying shear comprises two drums rotatable about parallel axes and each carrying a blade, the two blades meeting at each revolution to sever the stock. Such a shear is suitable for cutting comparatively thin material. A somewhat more complicated form of rotary flying shear is disclosed in Patent No. 2,157,000 granted May 2, 1939, and comprises two cranks rotatable about parallel axes and each pivotally supporting a hub on which a blade is mounted, each hub having an arm extending therefrom to control the angular position of the blade. A shear so constructed is suitable for cutting thick material, such as billets, requiring a considerable overlap of the blades to produce a satisfactory shearing action. In all rotary shears it is desirable that the velocity of the blades at the time of the cut should equal the velocity of the stock. If the shear is driven at a uniform speed of the proper value to produce a blade velocity equal to that of the stock, the stock will be cut into lengths equal to the circumference of the shear circle, which may be described as the circle in which the cutting edge of the blade travels or, in the case of a crank shear, the circle in which the crank pin travels. To cut thirty-foot billets in this manner it would be necessary to employ a shear circle thirty feet in circumference. In order to make it possible to cut lengths longer than the shear circle circumference, it has been proposed heretofore to impart a pulsing unidirectional angular velocity to the shear, such that the maximum velocity will be attained at the time of the cut and the minimum velocity will be attained between successive cuts. Such a procedure is entirely feasible, but its possibilities with respect to the cutting of increased lengths are decidedly limited, so that it has been necessary when cutting long pieces to stop and start the shear motor for each cut or to "gag" the shear by moving the shear drum away from the stock between successive cuts. Stop and start operation is inherently less accurate and for many purposes is undesirable. In many cases start and stop operation is impossible because of the extremely short time interval between successive cuts. Gagging requires complicated mechanism, and is hardly practical with heavy stock and high speeds, because of the enormous forces involved.

It is accordingly one object of the invention to provide a rotary shear adapted to cut comparatively long lengths of stock smoothly and accurately.

It is a further object of the invention to combine with a rotary shear of a known type a novel driving mechanism therefor so constructed and arranged that the shear may cut stock into lengths greatly in excess of the circumference of the shear circle.

It is a further object of the invention to provide a novel and advantageous mechanism for transmitting power from a continuously operating driving device to a rotary shear and so arranged that the speed of the shear blade can be synchronized with that of the stock even when cutting lengths greatly in excess of the circumference of the shear circle.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a plan view, partly in section, of a rotary shear and its associated driving mechanism;

Figure 1:
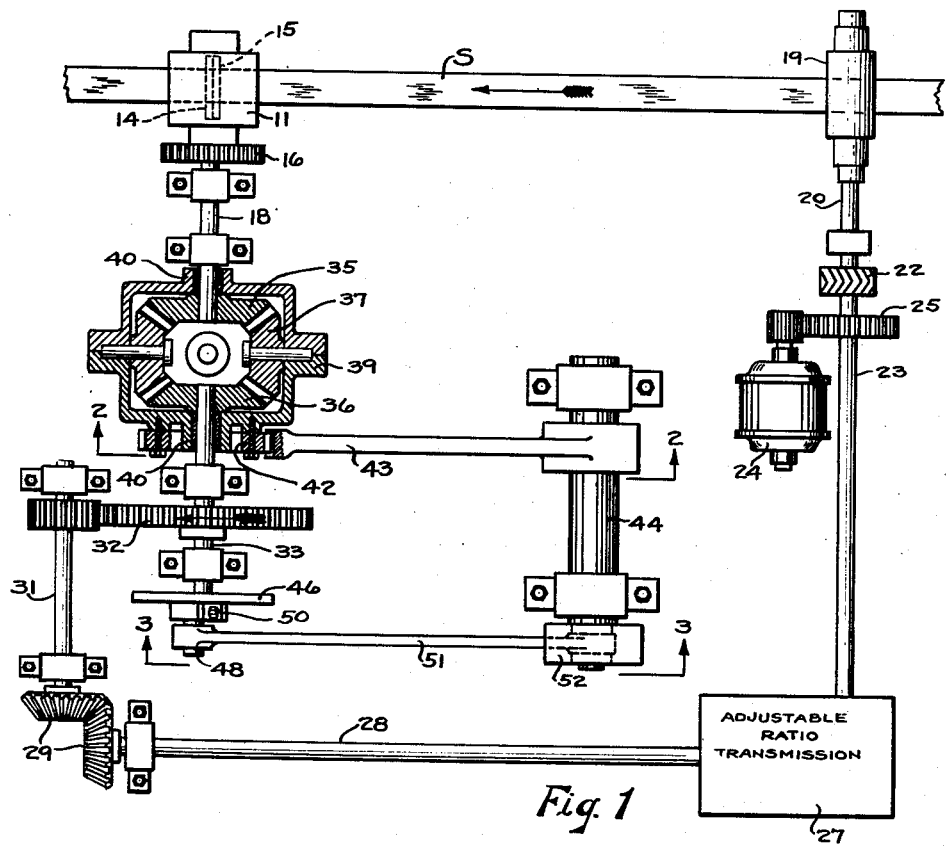

Figs. 4 to 7 inclusive are diagrammatic views showing successive positions of the shear blades; and Fig. 8 is a curve showing the velocity of the shear plotted against time.

The embodiment illustrated comprises a rotary shear 10 of well-known construction having an upper drum 11 and a lower drum 12 on which shear blades 14 and 15 are respectively mounted. These drums are rotatably supported about parallel horizontal axes, and they are connected by gears 16 (Fig. 1) so that they are compelled to rotate at the same speed but in opposed directions. A horizontal driving shaft 18 is aligned with one of the drums and connected thereto. Elongated material S is moved longitudinally by a suitable feeding means, such as rolls 19, and passes between the shear drums. The rolls 19 may be the finishing rolls of a continuous rolling mill arranged to deliver hot metal stock, and they may be driven in known manner by means of spindles 20, pinions 22, and a shaft 23 connected to one of the pinions, this shaft being driven by a motor 24 through gearing 25. The shaft 23 is connected by means of an adjustable ratio transmission 27 of any suitable and well-known type to a shaft 28, which in turn is connected by bevel gearing 29 to a shaft 31. This shaft 31 is connected by gearing 32 to a horizontal shaft 33 arranged in axial alignment with the shear driving shaft 18.

If now the shaft 33 is so connected to the shaft 18 as to drive the shear 10 at a uniform speed such that the peripheral velocity of the blades is equal to the velocity of the stock S, it is apparent that the stock will be severed into lengths equal to the circumference of the shear circle. Suppose for example that the stock is delivered by the rolls 19 at a speed of 600 feet per minute, and the circumference of the shear circle is 6 feet. Then by rotating the shaft 18 at a uniform rate of 100 revolutions per minute, the blade speed will be maintained equal to that of the stock, and lengths of 6 feet will be cut.

I have discovered that by imparting a novel and peculiar motion to the shear it is possible to cut lengths greatly in excess of the shear circle circumference. It will be noted from Figs. 5 and 7 that the shear can be turned in either direction to bring the blades as close as is practical to the moving stock without engaging the same, and that when the blades are so located the shear drums will each be displaced by the extent indicated as the angle $a$ from the cutting position shown in Fig. 4. The minimum size feasible for the angle $a$ will depend somewhat upon the construction of the shear, the thickness of the stock, and the amount of overlap of the blades. In the embodiment illustrated this angle is shown as thirty degrees. When cutting the maximum lengths of stock, the shear will be accelerated in a forward direction from the position shown in Fig. 7 to the cutting position shown in Fig. 4 and then decelerated while still traveling forwardly to the position shown in Fig. 5. The shear will then be immediately reversed and accelerated in a reverse direction until it reaches the position shown in Fig. 6, whereupon it will be decelerated while still moving in a reverse direction to the position shown in Fig. 7. The cycle will then be immediately repeated. It will be noted that in each cycle the shear will travel in a forward direction through an angle of 660 degrees and in a reverse direction through an angle of 300 degrees, making a total movement of 960 degrees per cycle.

Figure 2:
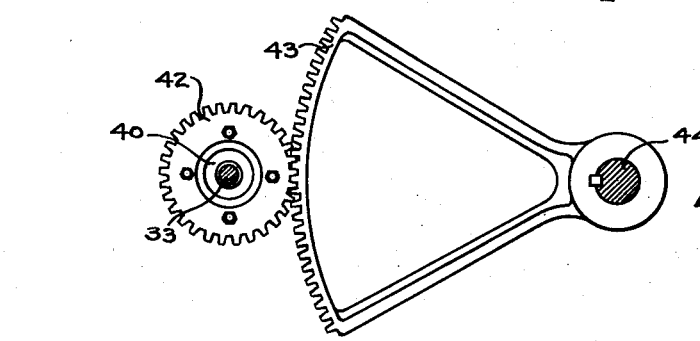
Fig. 2 is a section on the line 2—2 of Fig. 1.
Figure 3:
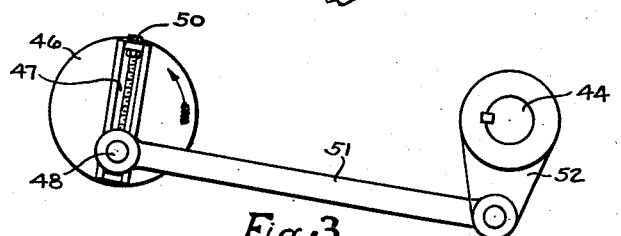
Fig. 3 is an elevation taken on the line 3—3 of Fig. 1.

One means for producing this shear movement is disclosed in Figs. 1 to 3. On the adjacent ends of the aligned shafts 18 and 33 there are mounted respectively two bevel gears 35 and 36. Between these gears and meshing therewith are planetary bevel gears 37 which are enclosed and supported in a rotatable carrier 39. This carrier is rotatably supported at its ends on the shafts 18 and 33 by means of bearings 40. This construction provides a differential gearing. Upon one end of the carrier 39 there is mounted an annular gear 42 which meshes with a gear segment 43 carried by a countershaft 44 parallel with the shaft 33. On the end of the shaft 33 there is mounted a crank disk 46 having a diametral groove 47 therein for the reception of a crank pin 48 which can be moved along the groove by means of a suitable adjusting device 50. The crank pin 48 is connected by a rod or link 51 to an arm 52 mounted on the countershaft 44. Thus, as the shaft 33 rotates, an oscillating motion will be imparted to the countershaft, and this oscillation will be transmitted in amplified form to the carirer 39 by means of the segment 43 and the gear 42.

It will now be explained how the amount of oscillation required for the carrier 39 may be calculated. In these calculations it is assumed that the oscillations will be simple harmonic, which is true except for the slight effect of the angularity of the connecting rod 51.

Let V = the velocity of the stock S, in feet per second.
C = the circumference of the shear circle, in feet.
L = the length of the pieces cut, in feet.
$a$ = angular displacement of the drive shaft 33, in degrees.
$b$ = angular displacement of the carrier 39, in degrees.
$c$ = angular displacement of the shear, in degrees.
P = the maximum displacement of the carrier 39, in degrees.

The displacements $a$, $b$, and $c$, may be measured from the positions which the parts assume at the time of the cut. We have the shear displacement represented by the following equation:

(1) $$c = a + 2b$$

The displacement of the carrier may be represented by the following equation:

(2) $$b = P \sin a$$

Then by substitution, we have (3) $$c = a + 2P \sin a$$

By differential calculus, we obtain (4) $$\frac{dc}{da} = 1 + 2P \cos a$$

At the time the shear reverses, it has reached a maximum displacement of 330 degrees, or $$\frac{330\pi}{180}$$

radians, and if the drive shaft displacement at this time is designated as A, we have by substitution in Equation 3:

(5) $$A + 2P \sin A = \frac{330\pi}{180}$$

At this same time, the slope of the curve representing shear displacement becomes zero, so that we have from Equation 4:

(6) $$1 + 2P \cos A = 0$$

Dividing Equation 5 by Equation 6 we obtain (7) $$\tan A = A - 5.76$$

Whence A = 1.8195 radians, or 104.25 degrees.

Substituting this value in Equation 3, we have (8) $$330 = 104.25 + 2P \sin 104.25°$$

Whence P = 116.4.

The carrier 39 must therefore oscillate through an angle of 2×116.4, or 232.8 degrees, when cutting the maximum lengths of stock. If the pitch radii of the gear segment 43 and gear 42 have a ratio of five to one, the angle of oscillation of the countershaft 44 and segment 43 will be $$\frac{232.8}{5} = 46.6 \text{ degrees (approx.)}$$

This amount of oscillation may be readily imparted to these parts by a proper radial adjustment of the crank pin 48.

The time required for each cycle will be $$\frac{L}{V}$$

seconds, and since the drive shaft rotates once during each cycle, its speed will be $$\frac{V}{L}$$

revolutions per second. Since the speed of the shear blades at the time of the cut is equal to the stock speed, the speed of the shear at the time of the cut will be $$\frac{V}{C}$$

revolutions per second. Hence the speed of the carrier 39 at the time of the cut will be $$\frac{\left(\frac{V}{C} - \frac{V}{L}\right)}{2}$$

revolutions per second, or $$180V\left(\frac{1}{C} - \frac{1}{L}\right)$$

degrees per second. Hence during each half-cycle, or $$\frac{L}{2V}$$

seconds, the carrier 39 will move with a simple harmonic motion through a definite arc, with a velocity at the mid-point of $$180V\left(\frac{1}{C} - \frac{1}{L}\right)$$

degrees per second. If this velocity were maintained uniform during this time, the total number of degrees traveled would be $$\frac{L}{2V}\left(180V\left[\frac{1}{C} - \frac{1}{L}\right]\right), \text{ or } 90\left(\frac{L}{C} - 1\right)$$

degrees. However, since the motion is simple harmonic, the degrees traveled will be reduced in the ratio of $$\frac{2}{\pi}$$

and we have, as the length of the arc traveled by the carrier, $$\frac{180}{\pi}\left(\frac{L}{C} - 1\right)$$

But we already know from the calculations above that this arc, which is 2P, has a value of 232.8 degrees. Thus we have (9) $$\frac{180}{\pi}\left(\frac{L}{C} - 1\right) = 232.8$$

Whence $$\frac{L}{C} = 5.063$$

and if $C$ is say 6 feet, $L = 30.38$ feet.

The operation of the invention will now be apparent from the above disclosure. The speed ratio of the transmission 27 will be so adjusted as to cause the shaft 33 to rotate in the correct speed relationship with respect to the rolls 19, so that cuts will be made at the proper times to produce the desired lengths of stock. For example, if thirty foot lengths are to be produced, the shaft 33 must make one revolution for every thirty feet of stock delivered by the rolls 19. The crank pin 48 will be adjusted to produce the correct amount of oscillation of the arm 52, as calculated in accordance with the method set forth above, and this oscillation will be transmitted in amplified form to the planetary carrier 39 through the medium of the shaft 44, the gear segment 43, and the gear 42. When cutting the comparatively long lengths for which the invention is particularly adapted, the velocity of the shear will be such as to form, when plotted against time, substantially a sine curve which crosses the zero axis and is offset relative thereto, as shown in Fig. 8. In the position shown in Fig. 7, which corresponds to the origin of the curve, the shear blades will be momentarily at rest close to the stock at the outlet side of the shear but out of contact therewith. From this position the shear will accelerate in a forward direction until the blades come together and the cut is made, as shown in Fig. 4, at which time the shear velocity will be at a maximum, corresponding to the stock velocity, and the crank pin 48 will be on one "quarter", as shown in Fig. 3. This position corresponds to the point b on the curve in Fig. 8. Following the completion of the cut the shear will decelerate, and as the crank pin 48 passes dead center position the movement of the gear segment 43 and of the planetary carrier 39 will reverse. As acceleration of this carrier takes place in the reverse direction, it will oppose to an increasing extent the effect of the drive shaft 33 in producing forward rotation of the shear, and by the time the shear reaches the position shown in Fig. 5 the carrier motion will exactly nullify the effect of the drive shaft motion and the shear will come to rest momentarily with its blades close to the stock at the inlet side of the shear but out of contact therewith. This position corresponds to the point c at which the curve in Fig. 8 crosses the zero axis. The effect of the reversed planetary motion will continue to increase, and the shear will now accelerate in the reverse direction until the crank pin 48 reaches the opposite "quarter" and the blades are in the position shown in Fig. 6, which corresponds to the point d on the curve in Fig. 8. The velocity of the planetary carrier will now decrease, and the shear will decelerate, while still traveling in the reverse direction, until the blades have reached their original positions as shown in Fig. 7, and the curve of Fig. 8 has returned to the zero axis at the point e. This completes one cycle, and the shear will continue to make cuts regularly so long as stock is delivered thereto.

The invention makes it possible for a rotary shear to cut lengths greatly in excess of the shear circle circumference, and yet the driving motor 24 operates continuously and is not compelled to start and stop for each cutting cycle. As demonstrated by the calculations set forth above, by means of the invention it is possible to cut lengths up to approximately five times the circumference of the shear circle. Thus, thirty foot billets can be cut with a shear having a shear circle diameter of only about twenty three inches and without gagging, a result impossible with any continuously operating rotary shear heretofore utilized.

Having thus described my invention, what I claim as new and desire to secure by Letters Patent is:

1. In combination with a rotary shear for the transverse cutting of longitudinally moving material, a differential gearing having three rotatable elements, means connecting one of said elements to the shear, power actuated means to rotate the second of said elements, and mechanism connecting the power actuated means to the third of said elements and arranged to oscillate the same through a comparatively large angle sufficient to produce in each cycle a forward movement of the shear through more than a complete revolution and a reverse movement of the shear through less than a complete revolution.

2. In combination with a rotary shear for the transverse cutting of longitudinally moving material, a differential gearing having three rotatable elements, means connecting one of said elements to the shear, power actuated means to rotate the second of said elements, a gear on the third of said elements, and mechanism connecting the power actuated means to the gear to oscillate the same.

3. In combination with a rotary shear for the transverse cutting of longitudinally moving material, a differential gearing having two axially aligned gears and a planetary element connecting the gears, means connecting one of the gears to the shear, driving means to rotate the other of said gears, a gear on the planetary element, and mechanism connecting the driving means to the last mentioned gear to oscillate the same.

4. In combination with a rotary shear for the transverse cutting of longitudinally moving material, a differential gearing having three rotatable elements, means connecting one of said elements to the shear, means to rotate the second of said elements, a countershaft, means to oscillate the countershaft in timed relation to the rotation of the second element, and means to transmit the oscillations of the countershaft in amplified form to the third of said elements.

5. In combination with a rotary shear for the transverse cutting of longitudinally moving material, a differential gearing having two axially aligned gears and a planetary element connecting the gears, means connecting one of said gears to the shear, driving means to rotate the other of said gears, a countershaft, means to oscillate the countershaft in timed relation to the rotation of the said other gear, and means to transmit the oscillations of the countershaft in amplified form to the planetary element.

6. In combination with a rotary shear for the transverse cutting of longitudinally moving material, a differential gearing having two axially aligned gears and a planetary element connecting the gears, means connecting one of the gears to the shear, driving means to rotate the other of said gears, a gear on the planetary element, a gear segment meshing with the last mentioned gear and having a pitch radius greater than that of the last mentioned gear, and means connecting the driving means to the gear segment to oscillate the same.

7. The method of operating a rotary shear having a blade for cutting longitudinally moving material comprising the steps of rotating the shear in a forward direction from a position of momentary rest through an angle of over 360 degrees, and then rotating the shear in the reverse direction through an angle of less than 360 degrees to the first position.

8. The method of operating a rotary shear having a blade for cutting longitudinally moving material comprising the steps of accelerating the shear in a forward direction from a position of momentary rest through an angle of over 180 degrees to bring the speed of the blade during the cut to substantial equality with the speed of the moving material, thereupon decelerating the shear through a further angle of over 180 degrees to a second position of momentary rest, and returning the shear in the reverse direction through an angle of less than 360 degrees to the first position.

9. The method of operating a rotary shear having a blade for cutting longitudinally moving material comprising the steps of accelerating the shear in a forward direction from a position of momentary rest, in which the blade is adjacent the material at the discharge side of the shear, to bring the speed of the blade during the cut to substantial equality with the speed of the moving material, thereupon decelerating the shear to bring the blade momentarily to rest in a position adjacent the material at the inlet side of the shear, and returning the shear in the reverse direction to the first position.

10. The method of operating a rotary shear having a blade for cutting longitudinally moving material comprising the steps of feeding the material past the shear, and imposing on the shear a cyclic angular velocity in timed relation with the speed of the material and such as to form, when plotted against time, substantially a sine curve which crosses the zero axis and is offset relative thereto.

11. A machine for the transverse cutting of longitudinally moving material in which a rotary blade has a forward rotary movement of over 360 degrees followed by a reverse rotary movement of less than 360 degrees to its original position.

12. In combination with a rotary shear for the transverse cutting of longitudinally moving material, means to rotate the shear in the forward direction from a position of momentary rest through an angle of over 360 degrees to a second position of momentary rest, and means to rotate the shear in the reverse direction through an angle of less than 360 degrees to the first position.

13. The method of cutting longitudinally moving material by means of a rotary shear into lengths greatly exceeding the circumference of the shear circle comprising the steps of rotating the shear in the forward direction from a position of momentary rest through an angle of over 360 degrees to a second position of momentary rest, and then rotating the shear in the reverse direction through an angle of less than 360 degrees to the first position.

MYLES MORGAN.